United States Patent
Phillips

(10) Patent No.: US 10,767,622 B2
(45) Date of Patent: Sep. 8, 2020

(54) HIGHLY EFFICIENT WIND TURBINE

(71) Applicant: Roger Gordon Phillips, Livingston, TX (US)

(72) Inventor: Roger Gordon Phillips, Livingston, TX (US)

( * ) Notice: Subject to any disclaimer, the term of this patent is extended or adjusted under 35 U.S.C. 154(b) by 251 days.

(21) Appl. No.: 16/074,395

(22) PCT Filed: Feb. 2, 2017

(86) PCT No.: PCT/IB2017/050578
§ 371 (c)(1),
(2) Date: Jul. 31, 2018

(87) PCT Pub. No.: WO2017/134604
PCT Pub. Date: Aug. 10, 2017

(65) Prior Publication Data
US 2020/0116120 A1  Apr. 16, 2020

Related U.S. Application Data

(60) Provisional application No. 62/289,468, filed on Feb. 1, 2016.

(51) Int. Cl.
*F03D 9/25* (2016.01)
*F03D 1/04* (2006.01)
*F03D 7/02* (2006.01)

(52) U.S. Cl.
CPC .............. *F03D 1/04* (2013.01); *F03D 7/0224* (2013.01); *F03D 9/25* (2016.05)

(58) Field of Classification Search
None
See application file for complete search history.

(56) References Cited

U.S. PATENT DOCUMENTS

| 4,600,360 A * | 7/1986 | Quarterman | F03D 1/04 415/148 |
| 7,220,096 B2 * | 5/2007 | Tocher | F03D 1/04 415/1 |
| 8,137,052 B1 * | 3/2012 | Schlegel | F03D 1/0625 415/4.3 |
| 10,197,038 B2 * | 2/2019 | Culpepper | F03B 13/264 |

(Continued)

FOREIGN PATENT DOCUMENTS

WO    WO2016085858 A1    6/2016

*Primary Examiner* — Michael Lebentritt

(57) ABSTRACT

A highly efficient wind turbine is used to generate electricity from wind. The highly efficient wind turbine includes a cowling, a turbine wheel, a support shaft, and an electricity-generating unit. The cowling is mounted around the support shaft and is used to protect the turbine wheel and channel wind. The turbine wheel is mounted to the support shaft and generates rotational energy from wind. The electricity-generating unit is coupled to the turbine wheel and converts rotational energy from the turbine wheel into electricity. A front wind-channeling cone and a back wind-channeling cone are mounted on either side of the turbine wheel. The front wind-channeling cone directs wind towards the outside of the turbine wheel to maximize leverage. The back wind-channeling cone is used to reduce drag. A wind accelerator is mounted around the cowling and is used to optimize the efficiency of the turbine by accelerating airflow.

12 Claims, 9 Drawing Sheets

(56) References Cited

U.S. PATENT DOCUMENTS

| | | | |
|---|---|---|---|
| 2009/0280009 A1* | 11/2009 | Brock | F03D 1/04 415/208.2 |
| 2010/0119362 A1* | 5/2010 | Becker | F03B 3/04 415/191 |
| 2011/0048019 A1* | 3/2011 | Smyth | F03D 1/04 60/722 |
| 2012/0128475 A1* | 5/2012 | Bailey | F03D 1/04 415/182.1 |
| 2013/0058758 A1* | 3/2013 | Lecanu | F03D 80/00 415/2.1 |
| 2019/0323479 A1* | 10/2019 | Madson | F03D 13/10 |

\* cited by examiner

HIGHLY EFFICIENT WIND TURBINE

The current application is a 371 of international Patent Cooperation Treaty (PCT) application PCT/IB2017/050578 filed on Feb. 2, 2017. The PCT application PCT/IB2017/050578 claims a priority to the U.S. Provisional Patent application Ser. No. 62/289,468 filed on Feb. 1, 2016.

FIELD OF THE INVENTION

The present invention relates generally to wind turbines. More specifically, the present invention is a highly efficient wind turbine that increases energy output by accelerating wind and by directing the wind to achieve maximum leverage.

BACKGROUND OF THE INVENTION

In order to combat pollution and the effects of global warming, the world is transitioning towards a greater use of renewable energy to supply power to homes and businesses. Though wind energy is utilized today, nearly all existing turbines are designed for large-scale power generation. Often, such turbines can lead to public backlash due to concerns for animal safety and a general dislike for the resulting change to the nearby scenery. Further, the blades of a wind turbine can reflect the rays of the sun, creating a nuisance for nearby homeowners and a potential safety risk for drivers in the area. As a result, large-scale and small-scale turbines alike have struggled to gain popularity. Currently, there is no existing turbine on the residential market that successfully hides the blade rotation of the turbine and offers a minimal risk to nearby wildlife. Further, there is no such turbine which can adequately supply the amount of electricity necessary to power an all electric home and recharge two electric vehicles.

Accordingly, there is a present need for a residential wind turbine capable of meeting existing and future demands for electricity, while also minimizing health risks for humans and animals alike. The present invention is a highly efficient wind turbine which operates through the rotation of a turbine wheel. The present invention channels wind towards the outer edges of the turbine wheel in order to maximize the amount of leverage that the wind has on the turbine wheel. This is done through the use of a front wind-channeling cone which directs air outwards. A cowling is positioned around the turbine wheel which helps to hide the blades of the turbine wheel and ensure that wind is directed through the turbine wheel. The present invention also uses a wind accelerator to accelerate the airflow through the turbine in order to improve overall efficiency.

By using a two-stage wind accelerator behind the turbine wheel, the wind velocity can be increased past 53.9% of the initial velocity. The average wind speed in the US is roughly 13 mph. The wind accelerator, mounted behind the turbine wheel, can increase the wind speed 59.3% to about 21 mph. As a result, wind can be pulled into the turbine at 21 mph. A front wind-channeling cone is used to direct the wind towards the edges of the turbine wheel, diffusing and augmenting the wind another 53.9% to roughly 32 mph. As a result, the present invention is capable of generating an increased energy output compared to traditional turbines.

DETAILED DESCRIPTION OF THE INVENTION

All illustrations of the drawings are for the purpose of describing selected versions of the present invention and are not intended to limit the scope of the present invention.

Figure 1:
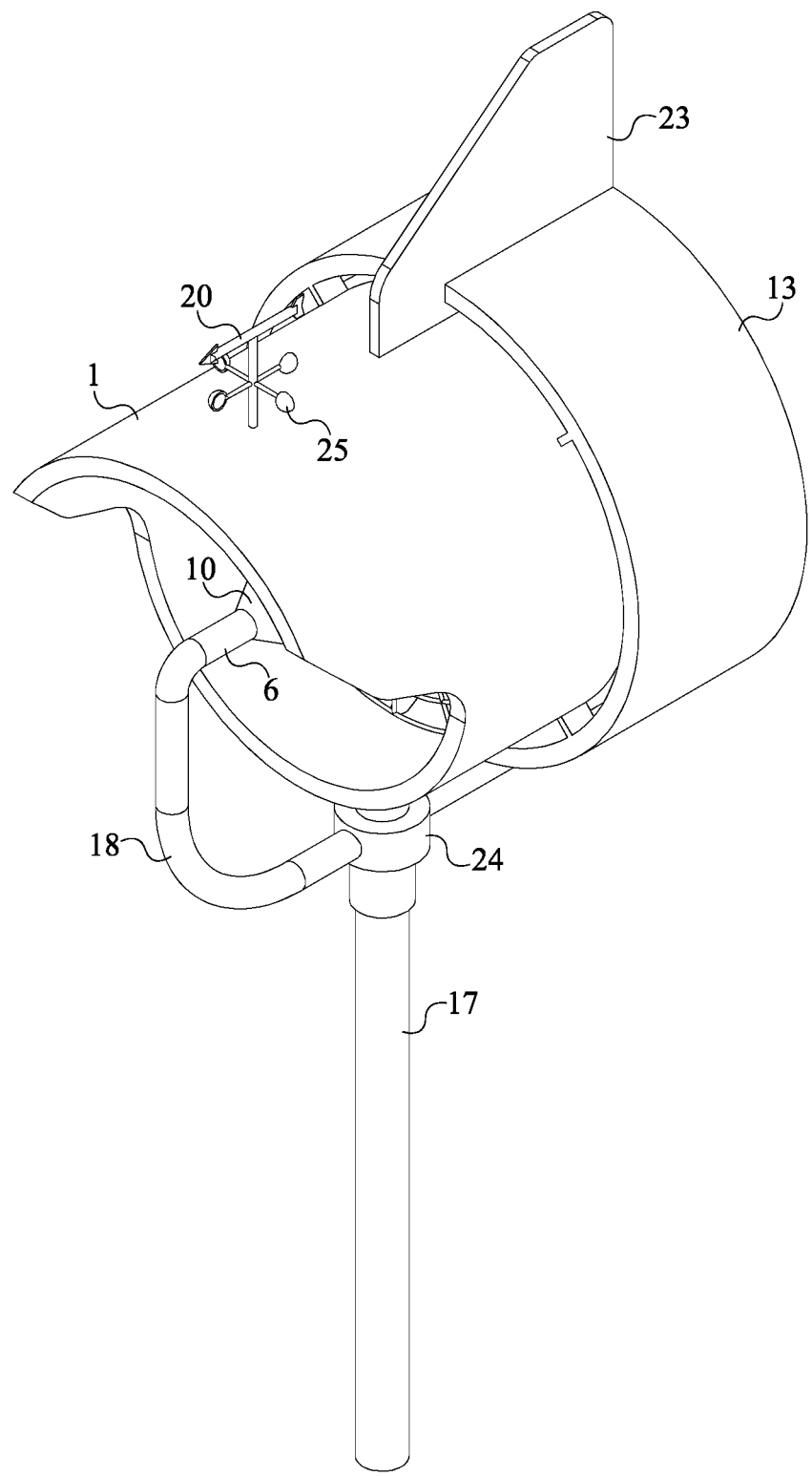
FIG. 1 is a front perspective view of the present invention.
Figure 2:
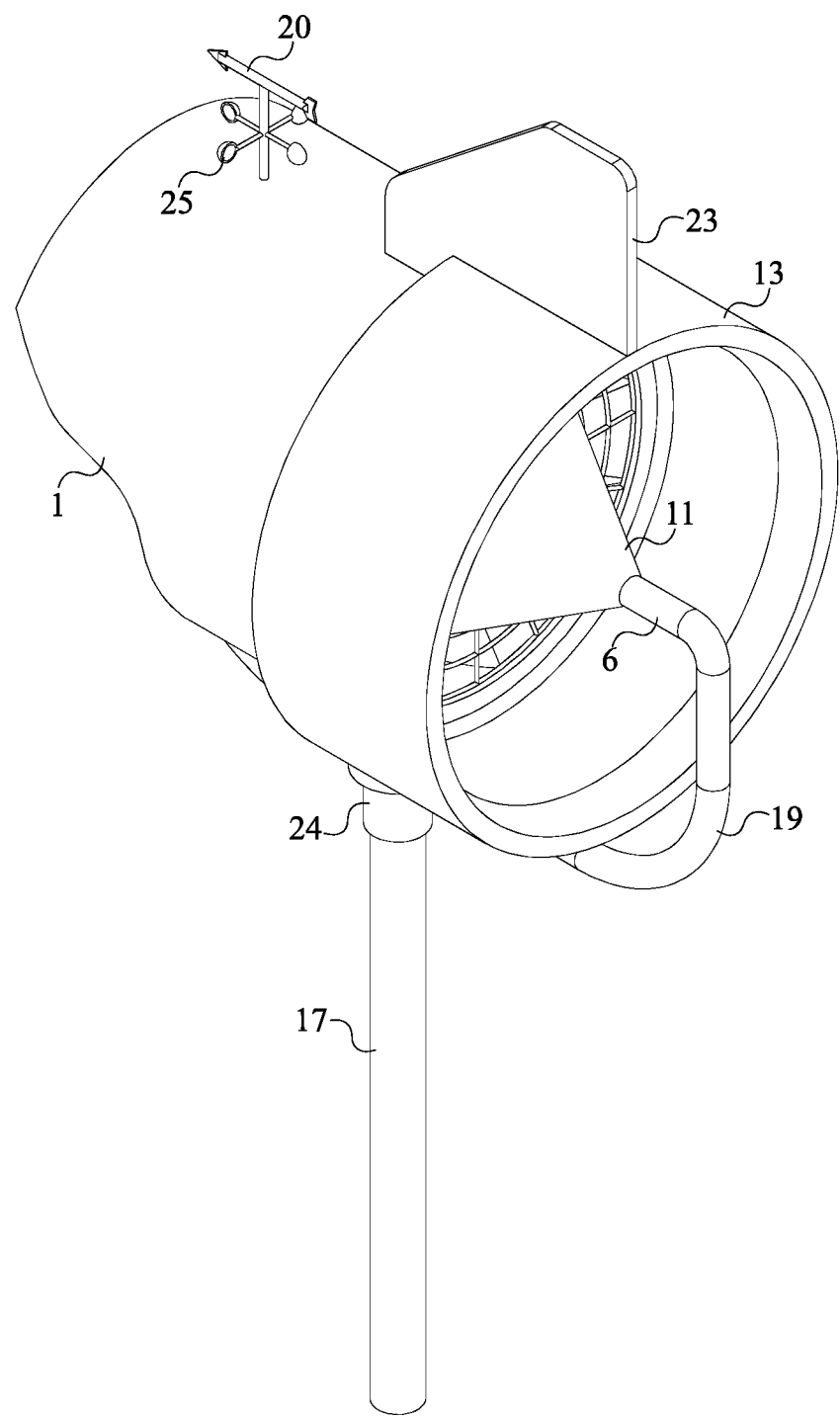
FIG. 2 is a rear perspective view of the present invention.
Figure 3:
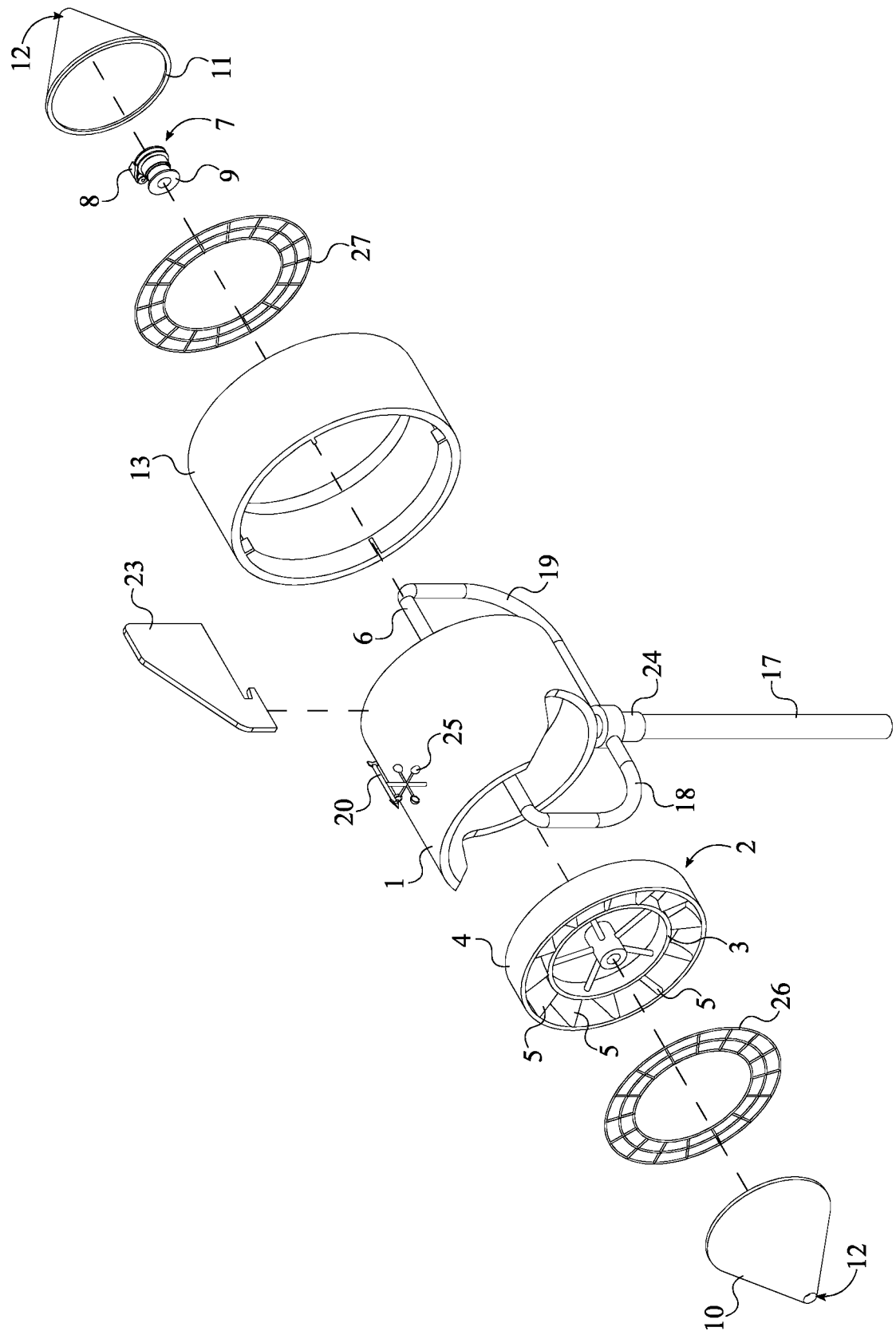
FIG. 3 is an exploded front perspective view of the present invention.

With reference to FIGS. 1-3, the present invention is a highly efficient wind turbine that may be used generate electricity. The present invention comprises a cowling 1, a turbine wheel 2, a support shaft 6, an electricity-generating unit 7, a front wind-channeling cone 10, a back wind-channeling cone 11, and a wind accelerator 13. The cowling 1 is concentrically mounted around the support shaft 6 and is used to protect the turbine wheel 2 from insects, birds, and flying debris. The cowling 1 is also used to conceal the turbine wheel 2 to prevent light from reflecting off the turbine wheel 2. The turbine wheel 2 is rotatably mounted about the support shaft 6. Similar to a traditional wind turbine, the turbine wheel 2 of the present invention is used to generate rotational energy from wind. The electricity-generating unit 7 is mounted onto the support shaft 6 and is used to convert the rotational energy produced by the turbine wheel 2 into electricity. The electricity-generating unit 7 is mechanically coupled to the turbine wheel 2 such that the turbine wheel 2 rotationally drives the electricity-generating unit 7. The front wind-channeling cone 10 and the back wind-channeling cone 11 are used to direct the flow of wind in a manner that optimizes efficiency.

Figure 4:
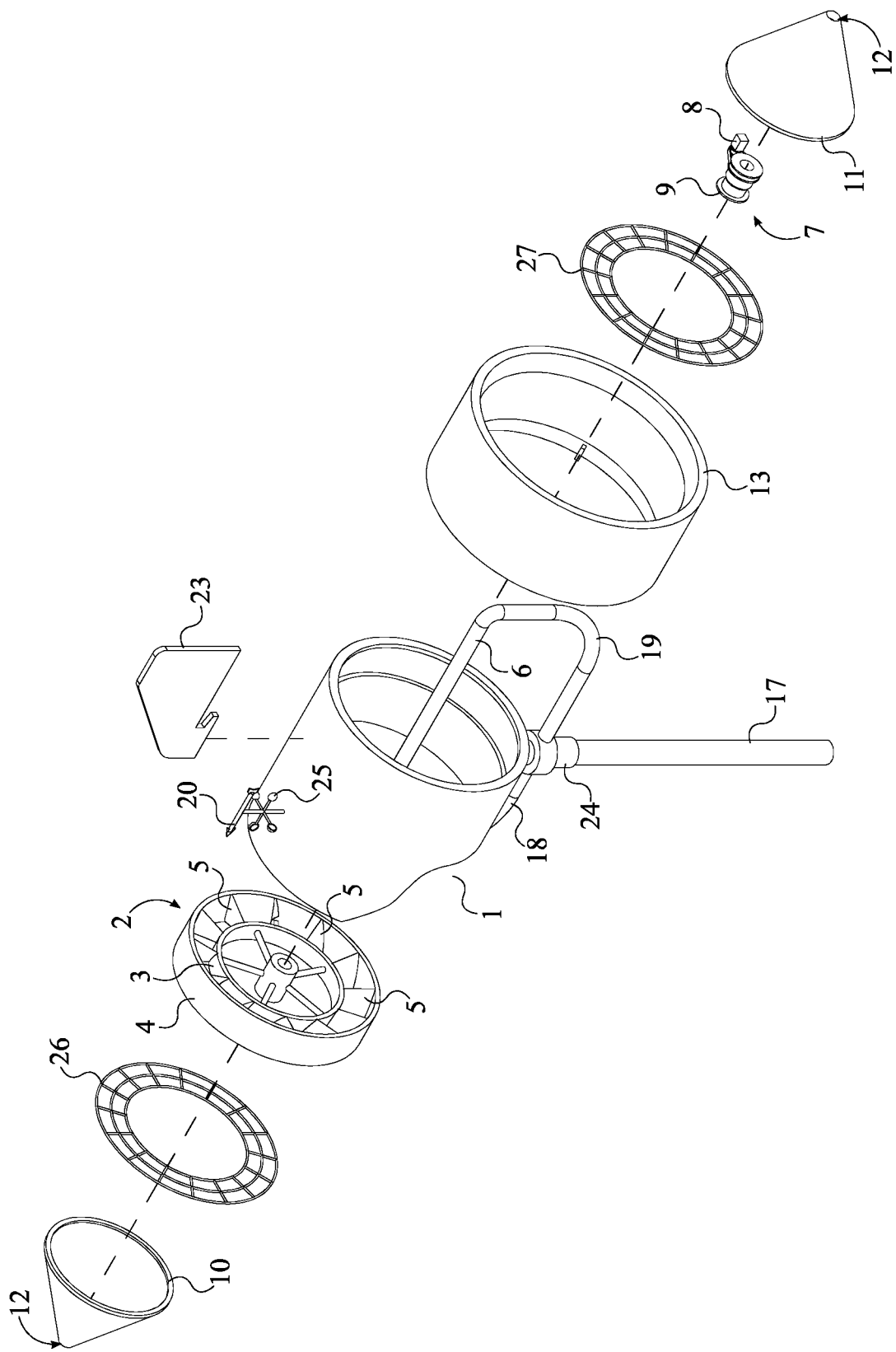
FIG. 4 is an exploded rear perspective view of the present invention.
Figure 6:
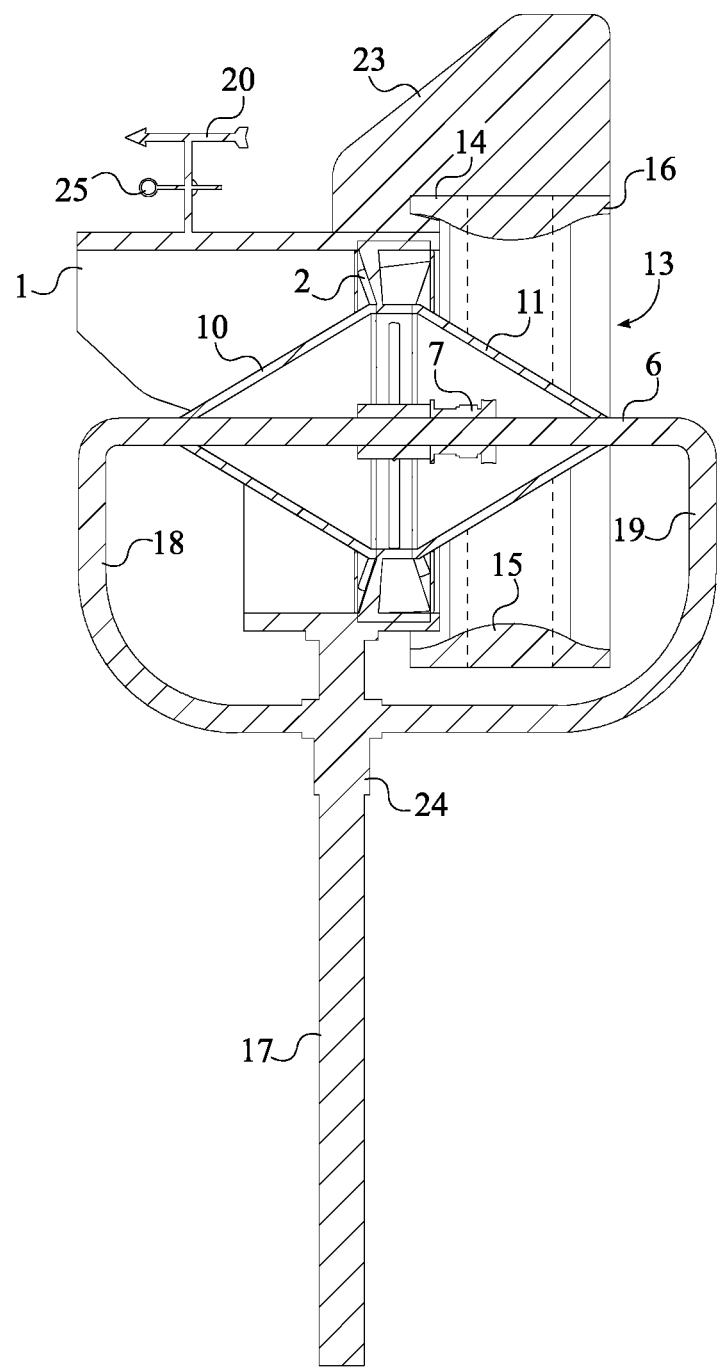
FIG. 6 is a right cross-sectional view taken along the line 6-6 in FIG. 5.

In reference to FIGS. 3-4, and FIG. 6, the front wind-channeling cone 10 and the back wind-channeling cone 11 are each concentrically mounted to the support shaft 6, adjacent to the turbine wheel 2. The front wind-channeling cone 10 and the back wind-channeling cone 11 are positioned opposite to each other about the turbine wheel 2. The front wind channeling cone is encircled by the cowling 1. A tip 12 of the front wind-channeling cone 10 is oriented away from the turbine wheel 2. This arrangement allows the front wind-channeling cone 10 to direct airflow to the edges of the turbine wheel 2. By forcing the wind outwards, the wind can impart a greater force on the turbine wheel 2, allowing the turbine wheel 2 to spin more easily. The back wind-channeling cone 11 is encircled by the wind accelerator 13. A tip 12 of the back wind-channeling cone 11 is oriented away from the turbine wheel 2. This arrangement allows the back wind-channeling cone 11 to prevent a pocket of low pressure from forming behind the turbine wheel 2. Minimizing such an area of low pressure reduces the drag experienced by the turbine wheel 2 and helps to improve efficiency. The wind accelerator 13 is mounted around the cowling 1. The wind accelerator 13 makes use of the Venturi effect, constricting and thereby accelerating the airflow through the present invention. In doing so, the present invention is able to extract more energy from the wind and generate additional electricity.

In reference to FIG. 3, the turbine wheel 2 comprises an inner turbine ring 3, an outer turbine ring 4, and a plurality of blades 5. The inner turbine ring 3 is concentrically mounted to the support shaft 6 and is used to offset the plurality of blades 5 from the support shaft 6. As previously mentioned, wind that traverses through the present invention is directed towards the outer edges of the turbine wheel 2. By offsetting the plurality of blades 5 from the support shaft 6, smaller blades may be used to reduce material costs. Each of the plurality of blades 5 utilize an airfoil shape to generate lift which rotates the turbine wheel 2. The exact shape for each of the plurality of blades 5 may change depending on the operating wind speed but is expected to be optimized for maximum efficiency. The outer turbine ring 4 is concentrically aligned with the inner turbine ring 3 and is offset from the inner turbine ring 3. The plurality of blades 5 is radially connected in between the inner turbine ring 3 and the outer turbine ring 4. In this arrangement, the inner turbine ring 3 and the outer turbine ring 4 brace and protect each of the plurality of blades 5. The plurality of blades 5 is equally distributed around the inner turbine ring 3 to ensure that the turbine wheel 2 is balanced. The plurality of blades 5 may be coated in a non-reflecting coating in order to prevent light from flickering off the blades 5 during operation.

Figure 5:
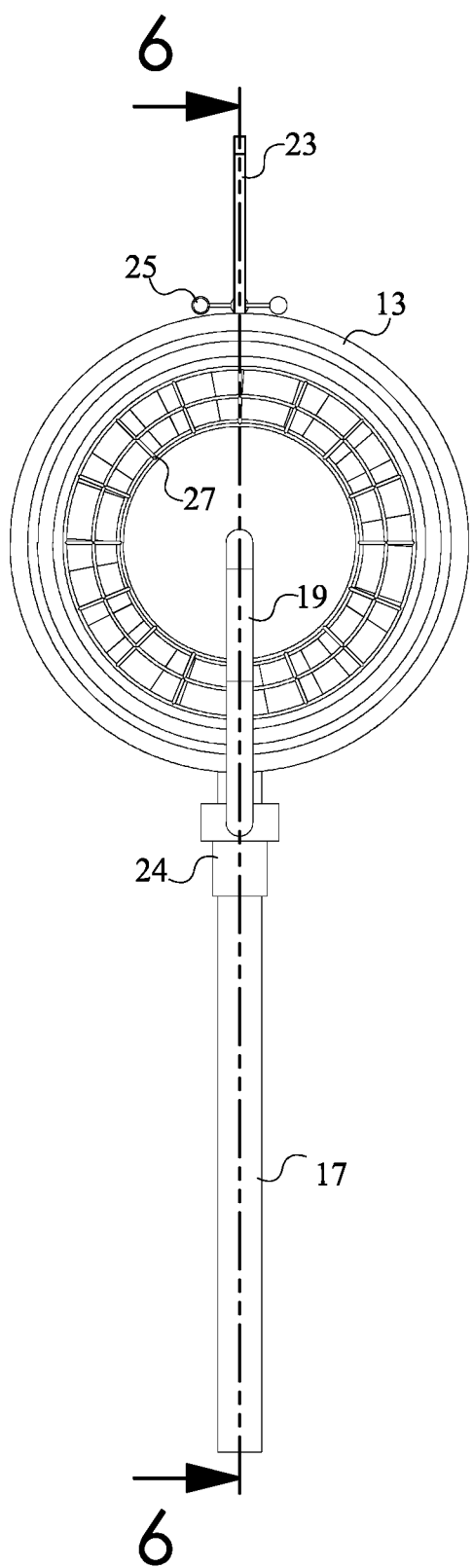
FIG. 5 is an exploded rear perspective view of the present invention.

In reference to FIGS. 5-6, the wind accelerator 13 comprises an inlet portion 14, a wind-accelerating portion 15, and an outlet portion 16. The wind-accelerating portion 15 is used to constrict and accelerate the airflow within the wind accelerator 13. The inlet portion 14 and the outlet portion 16 are perimetrically connected about the wind-accelerating portion 15. The inlet portion 14 and the outlet portion 16 are positioned opposite to each other along the wind-accelerating portion 15. The inlet portion 14 and the outlet portion 16 are used to provide a smooth transition between the unaltered airflow and the accelerated airflow. The inlet portion 14 is oriented towards the front wind-channeling cone 10. The inlet portion 14 is offset from the cowling 1 such that both the airflow within the cowling 1 and the ambient wind may be directed into the wind accelerator 13.

Figure 7:
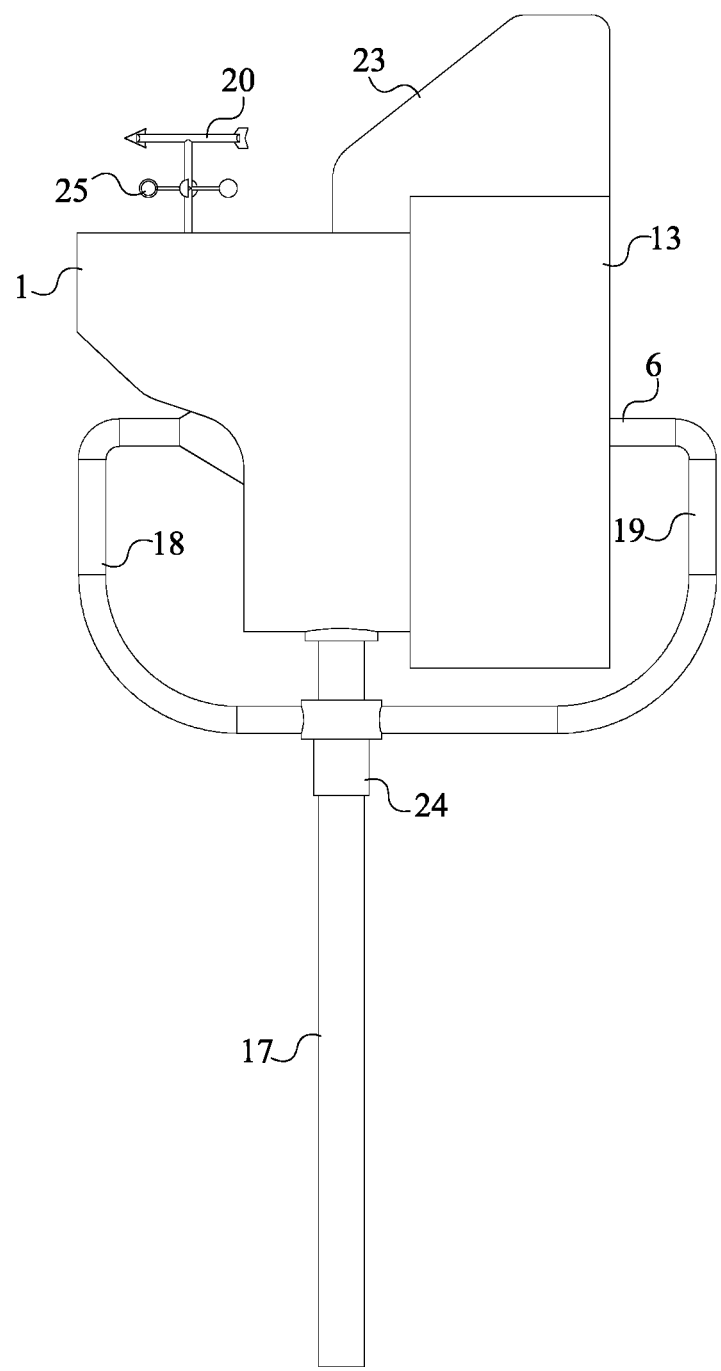
FIG. 7 is a right side view of the present invention.

In reference to FIG. 7, the present invention further comprises a base 17, a front brace 18, and a back brace 19. In the preferred embodiment of the present invention, the base 17 is a long pole which is used to offset the turbine wheel 2 from the ground so that steadier and stronger winds may be accessed. The support shaft 6 is terminally mounted to the base 17 by the front brace 18 and the back brace 19. The front brace 18 is positioned adjacent to the front wind-channeling cone 10. The back brace 19 is positioned adjacent to the back wind-channeling cone 11. This arrangement allows the front brace 18 and the back brace 19 to reinforce the support shaft 6.

In reference to FIG. 7, the present invention further comprises a turbine tail 23 and a passive yaw-adjustment system 24. In this embodiment, the orientation of the present invention is adjusted using the wind itself to rotate the turbine wheel 2 into the direction of the wind. The cowling 1 is rotatably mounted to the base 17 through the passive yaw-adjustment system 24. The passive yaw-adjustment system 24 allows the cowling 1 to freely rotate so that changes in wind direction can be immediately accounted for. The turbine tail 23 is laterally connected to the wind accelerator 13 and the cowling 1. The turbine tail 23 and the base 17 are diametrically opposed to each other about the cowling 1. The turbine tail 23 is designed to align perpendicular to the direction of the wind. As a result, when the wind direction changes, the wind supplies a force onto the turbine tail 23, creating an imbalance relative to the passive yaw-adjustment system 24 which is used to correct the orientation of the cowling 1.

In an alternative embodiment of the present invention, the present invention comprises a wind vane 20, a control unit 21, and an active yaw-adjustment system 22. In reference to FIGS. 8-9, the active yaw-adjustment system 22 is used to orient the turbine wheel 2 into the wind such that the optimal amount of energy may be captured from the wind. The cowling 1 is rotatably mounted to the base 17 through the active yaw-adjustment system 22, allowing the cowling 1 to rotate as the active yaw-adjustment system 22 is actuated. The wind vane 20 is rotatably mounted to the cowling 1. The base 17 and the wind vane 20 are diametrically opposed to each other about the cowling 1. The wind vane 20 is used to measure wind direction so that the orientation of the present invention may be adjusted. The wind vane 20 is electronically connected to the control unit 21. This arrangement allows the control unit 21 to monitor readings from the wind vane 20. The control unit 21 is electrically connected to the active yaw-adjustment system 22. This allows the control unit 21 to actuate the active yaw-adjustment based on readings from the wind vane 20.

Figure 8:
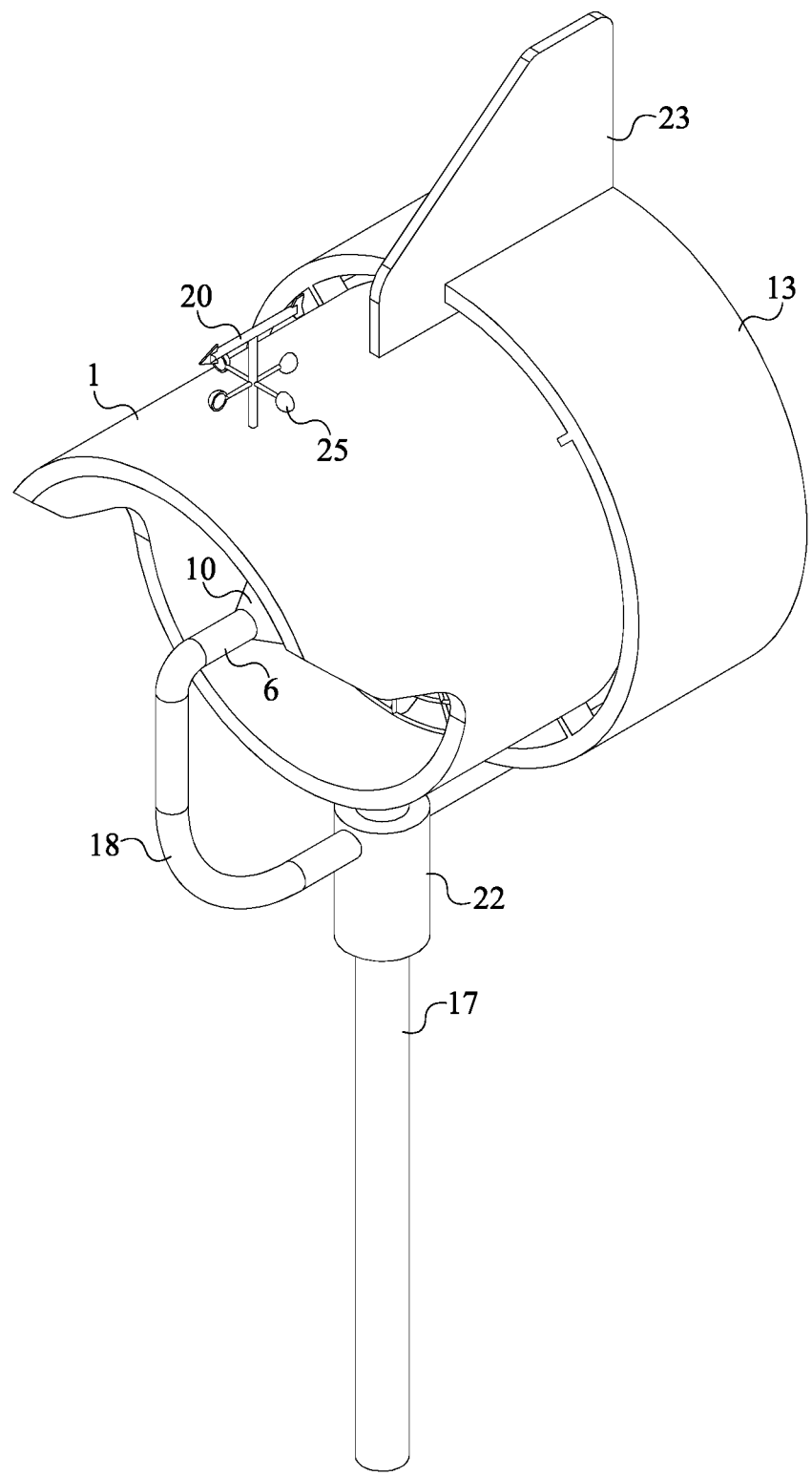
FIG. 8 is front perspective view of an alternative embodiment of the present invention, wherein the cowling is mounted to the base through the active yaw-adjustment system.
Figure 9:
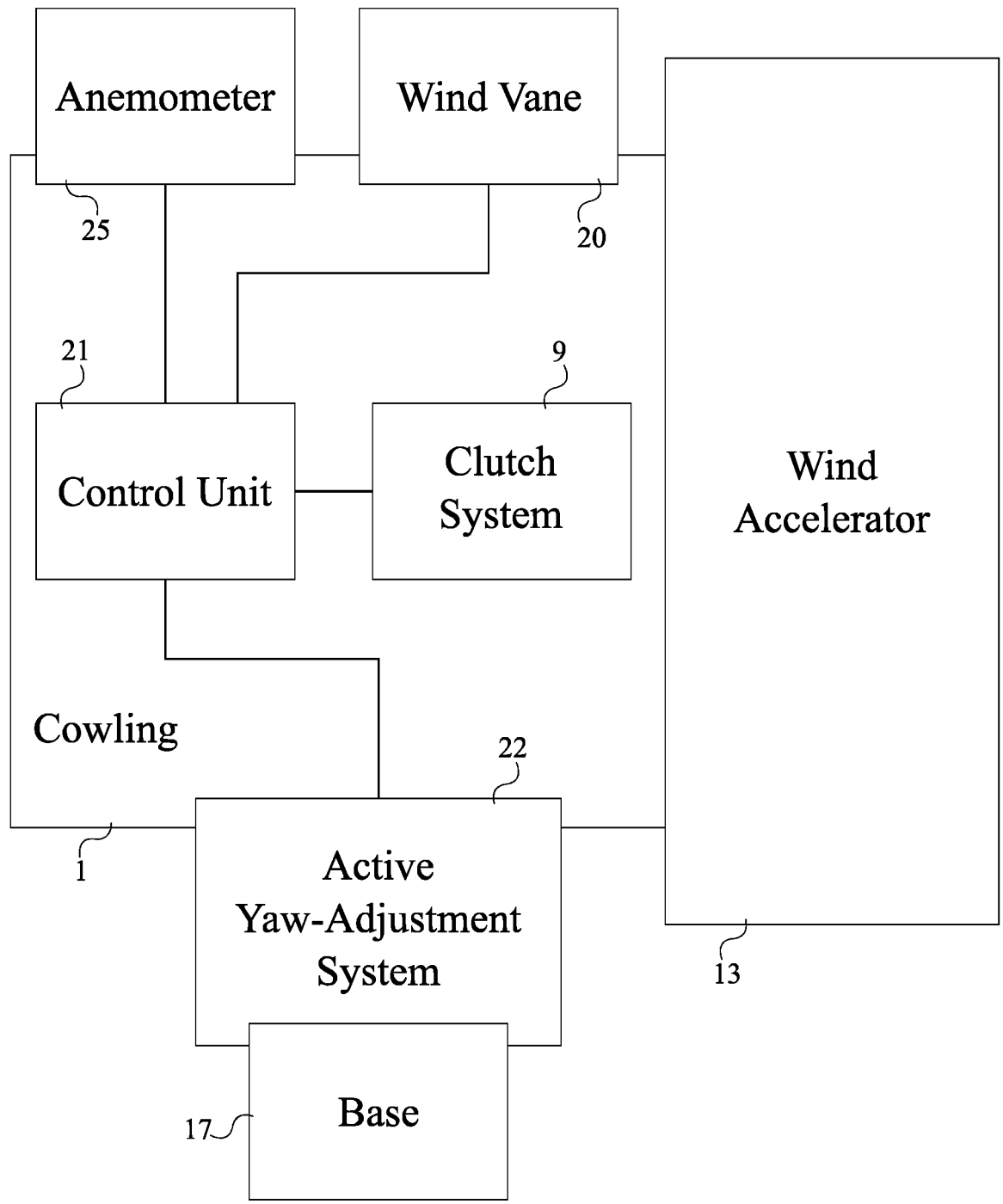
FIG. 9 is a schematic diagram showing the electrical connections of the present invention.

In reference to FIGS. 8-9, the present invention further comprises an anemometer 25. The anemometer 25 is rotatably mounted to the cowling 1 and is used to measure wind speed. The anemometer 25 and the base 17 are diametrically opposed to each other about the cowling 1. The anemometer 25 is electronically connected to the control unit 21. This arrangement allows the control unit 21 to monitor the wind speed and make adjustments if conditions become precarious. Such adjustments can include the limiting of airflow to the turbine wheel 2 or braking the turbine wheel 2. This can be useful if wind speeds exceed a safe operable speed. One possible means of limiting airflow involve the deployment of an expandable shield. The expandable shield is mounted onto the front wind-channeling cone 10 and may be expanded in between the cowling 1 and the front wind-channeling cone 10 to reduce or restrict airflow. Alternatively, in an alternative embodiment of the front wind-channeling cone 10, the front wind-channeling cone 10 comprises a plurality of flexible panels which may be expanded outwards to obstruct the turbine wheel 2 from the wind.

In reference to FIG. 3, the present invention further comprises a first wire screen 26. The first wire screen 26 is used to protect the turbine wheel 2 from birds, insects, and flying debris. The first wire screen 26 is radially mounted within the cowling 1. The first wire screen 26 is positioned adjacent to the turbine wheel 2, opposite to the back wind-channeling cone 11. The first wire screen 26 is extended from the front wind-channeling cone 10 to the cowling 1. The fineness of the wire screen may be customized based on the location in which the present invention is erected. A finer wire screen may restrict airflow, but will provide a better protection against debris.

In reference to FIG. 4, the present invention further comprises a second wire screen 27. Similar to the first wire screen 26, the second wire screen 27 is radially mounted within the cowling 1. The second wire screen 27 is also used to protect the turbine wheel 2 from birds, insects, and flying debris. Because the present invention is designed so that the front wind-channeling cone 10 is always oriented into the wind, the second wire screen 27 may be optionally used by the end user. The second wire screen 27 is positioned adjacent to the turbine wheel 2, opposite to the front wind-channeling cone 10. The second wire screen 27 is extended from the back wind-channeling cone 11 to the cowling 1. The fineness of the second wire screen 27 may also be customized and may differ from that of the first wire screen 26 if desired.

In reference to FIG. 3, and FIG. 6, the electricity-generating unit 7 comprises at least one generator 8 and a clutch system 9. The generator 8 is mounted onto the support shaft 6 and is used to convert rotational energy from the turbine wheel 2 into electricity. The clutch system 9 is rotatably mounted about the support shaft 6. The clutch system 9 is used to engage and disengage the generator 8 with the turbine wheel 2. The generator 8 and the clutch system 9 are positioned within the back wind-channeling cone 11. The clutch system 9 is torsionally connected to the turbine wheel 2 such that the clutch system 9 rotates with the turbine wheel 2. The generator 8 is selectively engaged with the clutch system 9. In alternative embodiments of the present invention, multiple generators 8 may be engaged with the clutch system 9 to capitalize on high wind speeds. The clutch system 9 is electrically connected to the control unit 21. This arrangement allows the control unit 21 to regulate when the generator 8 is engaged with the clutch system 9.

Although the invention has been explained in relation to its preferred embodiment, it is to be understood that many other possible modifications and variations can be made without departing from the spirit and scope of the invention as hereinafter claimed.

What is claimed is:

1. A highly efficient wind turbine comprises:
   a cowling;
   a turbine wheel;
   a support shaft;
   an electricity-generating unit;
   a front wind-channeling cone;
   a back wind-channeling cone;
   a wind accelerator;
   the cowling being concentrically mounted around the support shaft;
   the turbine wheel being rotatably mounted about the support shaft;
   the electricity-generating unit being mounted onto the support shaft;
   the electricity-generating unit being mechanically coupled to the turbine wheel, wherein the turbine wheel rotationally drives the electricity-generating unit;
   the front wind-channeling cone and the back wind-channeling cone being concentrically mounted to the support shaft, adjacent to the turbine wheel;
   the front wind-channeling cone and the back wind-channeling cone being positioned opposite to each other about the turbine wheel;
   the wind accelerator being mounted around the cowling;
   the front wind-channeling cone being encircled by the cowling; and
   the back wind-channeling cone being encircled by the wind accelerator.

2. The highly efficient wind turbine as claimed in claim 1 comprises:
   the turbine wheel comprises an inner turbine ring, an outer turbine ring, and a plurality of blades;
   the inner turbine ring being concentrically mounted to the support shaft;
   the outer turbine ring being concentrically aligned with the inner turbine ring;
   the plurality of blades being radially connected in between the inner turbine ring and the outer turbine ring; and
   the plurality of blades being equally distributed around the inner turbine ring.

3. The highly efficient wind turbine as claimed in claim 1 comprises:
   the wind accelerator comprises an inlet portion, a wind-accelerating portion, and an outlet portion;
   the inlet portion and the outlet portion being perimetrically connected around the wind-accelerating portion;
   the inlet portion and the outlet portion being positioned opposite to each other along the wind-accelerating portion; and
   the inlet portion being oriented towards the front wind-channeling cone.

4. The highly efficient wind turbine as claimed in claim 1 comprises:
   a base;
   a front brace;
   a back brace;
   the support shaft being terminally mounted to the base by the front brace and the back brace;
   the front brace being positioned adjacent to the front wind-channeling cone; and
   the back brace being positioned adjacent to the back wind-channeling cone.

5. The highly efficient wind turbine as claimed in claim 4 comprises:
   a wind vane;
   a control unit;
   an active yaw-adjustment system;
   the cowling being rotatably mounted to the base through the active yaw-adjustment system;
   the wind vane being rotatably mounted to the cowling;
   the base and the wind vane being diametrically opposed to each other about the cowling;
   the wind vane being electronically connected to the control unit; and
   the control unit being electrically connected to the active yaw-adjustment system.

6. The highly efficient wind turbine as claimed in claim 4 comprises:
   a turbine tail;
   a passive yaw-adjustment system;
   the cowling being rotatably mounted to the base through the passive yaw-adjustment system;
   the turbine tail being laterally connected to the wind accelerator and the cowling; and
   the turbine tail and the base being diametrically opposed to each other about the cowling.

7. The highly efficient wind turbine as claimed in claim 4 comprises:
   an anemometer;
   a control unit;
   the anemometer being rotatably mounted to the cowling;
   the anemometer and the base being diametrically opposed to each other about the cowling; and
   the anemometer being electronically connected to the control unit.

8. The highly efficient wind turbine as claimed in claim 1 comprises:
   a first wire screen;
   the first wire screen being radially mounted within the cowling;

the first wire screen being positioned adjacent to the turbine wheel, opposite to the back wind-channeling cone; and the first wire screen being extended from the front wind-channeling cone to the cowling.

9. The highly efficient wind turbine as claimed in claim 1 comprises:

a second wire screen;

the second wire screen being radially mounted within the cowling;

the second wire screen being positioned adjacent to the turbine wheel, opposite to the front wind-channeling cone; and the second wire screen being extended from the back wind-channeling cone to the cowling.

10. The highly efficient wind turbine as claimed in claim 1 comprises:

the electricity-generating unit comprises at least one generator and a clutch system;

the generator being mounted onto the support shaft;

the clutch system being rotatably mounted about the support shaft;

the generator and the clutch system being positioned within the back wind-channeling cone;

the clutch system being torsionally connected to the turbine wheel; and the generator being selectively engaged with the clutch system.

11. The highly efficient wind turbine as claimed in claim 10 comprises:

a control unit; and the clutch system being electrically connected to the control unit.

12. The highly efficient wind turbine as claimed in claim 1 comprises:

a tip of the front wind-channeling cone being oriented away from the turbine wheel; and a tip of the second wind channeling cone being oriented away from the turbine wheel.

* * * * *